(12) United States Patent
Boothroyd et al.

(10) Patent No.: US 10,157,484 B2
(45) Date of Patent: Dec. 18, 2018

(54) SCHEMA-DRIVEN OBJECT ALIGNMENT

(71) Applicant: INTERNATIONAL BUSINESS MACHINES CORPORATION, Armonk, NY (US)

(72) Inventors: Richard Boothroyd, Cambridge (GB); Robert L. Kerr, Cambridge (GB); Michael P. Kirwan, Cambridge (GB); Kevin J. Sayer, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/067,532

(22) Filed: Mar. 11, 2016

(65) Prior Publication Data
US 2017/0263025 A1 Sep. 14, 2017

(51) Int. Cl.
*G06T 11/20* (2006.01)
*G06T 11/60* (2006.01)
*G06F 3/0484* (2013.01)

(52) U.S. Cl.
CPC ........ *G06T 11/206* (2013.01); *G06F 3/04842* (2013.01); *G06T 11/60* (2013.01); *G06T 2200/24* (2013.01)

(58) Field of Classification Search
CPC ....... G06T 11/206; G06T 19/20; G06T 11/60; G06T 2200/24; G06F 3/0484; G06F 3/04842; G06F 3/0416; G06F 3/0418
USPC ............... 345/651, 654, 662, 665, 677, 680; 715/812, 813, 822, 798, 799
See application file for complete search history.

(56) References Cited

U.S. PATENT DOCUMENTS

| 7,093,192 B2* | 8/2006 | Mullen ................. G06T 11/206 345/418 |
| 7,110,005 B2 | 9/2006 | Arvin et al. |
| 7,545,392 B2 | 6/2009 | Sprang et al. |
| 8,670,957 B2 | 3/2014 | Dayde et al. |
| 2003/0206169 A1* | 11/2003 | Springer ............ G06F 3/04845 345/442 |

(Continued)

OTHER PUBLICATIONS

Heo et al., "Design of a Shape Dependent Snapping Algorithm," CHI 2012, May 5-10, 2012, p. 2207-2212, ACM, Austin, Texas, USA.

(Continued)

*Primary Examiner* — Diane Wills
(74) *Attorney, Agent, or Firm* — Erik K. Johnson; Reza Sarbakhsh

(57) ABSTRACT

A method is provided for enabling a schema-driven object alignment on a canvas. The method may include receiving an indication of a selected object on the canvas, identifying a closest compatible object displayed closest to a position of the selected object on the canvas wherein a link associated is formed between an item represented by the closest compatible object and the item represented by the selected object. The method may further include defining an alignment guide for the closest compatible object. The method may also include, determining whether the selected object has been moved within a determined range of the alignment guide, and in response to the determination that the selected object has been moved within the determined range of the alignment guide, modifying a location at which the selected object is displayed on the canvas so that the selected object is aligned with the alignment guide.

18 Claims, 4 Drawing Sheets

(56) References Cited

U.S. PATENT DOCUMENTS

| | | | |
|---|---|---|---|
| 2006/0262134 A1* | 11/2006 | Hamiter | G06F 19/321 |
| | | | 345/619 |
| 2009/0327872 A1 | 12/2009 | Kamiyama et al. | |
| 2013/0278638 A1* | 10/2013 | Yoshikawa | G06T 11/206 |
| | | | 345/681 |
| 2013/0332869 A1* | 12/2013 | Ferry | G06F 8/38 |
| | | | 715/765 |
| 2014/0096012 A1 | 4/2014 | Grosz et al. | |
| 2014/0096026 A1* | 4/2014 | Grosz | G06F 3/0484 |
| | | | 715/744 |
| 2014/0258953 A1* | 9/2014 | Dai | G06F 17/5081 |
| | | | 716/112 |
| 2014/0331181 A1* | 11/2014 | Hildreth | G06F 3/011 |
| | | | 715/821 |
| 2014/0372939 A1 | 12/2014 | Parker et al. | |
| 2016/0098033 A1* | 4/2016 | Singh | G05B 19/4097 |
| | | | 700/98 |

OTHER PUBLICATIONS

Pritch et al., "Snap Image Composition," Computer Vision/Computer Graphics Collaboration Techniques, 2011, p. 181-191, LNCS 6930, Springer-Verlag Berlin Heidelberg.

Watson, "Object Snap," AutoCAD Tutorial, p. 1-12, http://www.cadtutor.net/tutorials/autocad/object-snap.php, Accessed on Mar. 8, 2016.

* cited by examiner

SCHEMA-DRIVEN OBJECT ALIGNMENT

BACKGROUND

The present invention relates to schema-driven object alignment on a canvas. In particular, it relates to the use of alignment guides to enable a user to align objects on a canvas.

Digital canvasses may be used to display graphical representations of charts to users. Digital canvasses may include objects or shapes displayed at different locations on the canvas to provide the graphical representation to the user. The user is typically enabled to rearrange objects on the digital canvas to change the graphical representation to be more to their liking. It is known that alignment guides may be used to help align the objects on a digital canvas based on conceptual horizontal or vertical grid lines of the canvas.

SUMMARY

According to a first aspect of the invention, there is provided a computer-implemented method for enabling schema-driven object alignment on a canvas. The canvas is arranged to display a chart comprising a plurality of items. Each of the items has an associated item type defined by one or more schemas associated with the chart. The one or more schemas further include definitions of one or more link types of links which may be formed between items in the chart. Additionally, the schemas include definitions of criteria specifying whether a link of each link type may be validly formed between any two or more items. The canvas comprises a plurality of objects. Each of the objects represents a respective item of the chart. The method receives an indication, from a user, of a selected object on the canvas. The method identifies, from amongst the plurality of objects, a closest compatible object which is displayed closest to a current position of the selected object on the canvas and for which a link of at least one of the one or more link types may be formed between that item and the item represented by the selected object. The method defines an alignment guide for the closest compatible object. In response to a movement of the selected object by the user, the method calculates whether the selected object has been moved within a predetermined range of the alignment guide. If the selected object has been moved within a predetermined range of the alignment guide, the method modifies the location at which the selected object is displayed on the canvas so that the selected object is aligned with the alignment guide.

According to a second aspect of the invention, there is provided a system for enabling schema-driven object alignment on a canvas. The system comprises a display for displaying a view of the canvas. The system further comprises a user input device for receiving an indication, from a user, of a selected object on the canvas. The system further comprises a processor configured to carry out the steps of the method according to the first aspect.

According to a third aspect of the invention, there is provided a computer program product for enabling schema-driven object alignment on a canvas. The computer program product comprises a computer readable storage medium. The computer readable storage medium has program instructions which are executable by a processor stored thereon. The program instructions are executable by a processor to cause the processor to carry out the steps of the method according to the first aspect.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

In the description that follows and in the figures, certain embodiments of the invention are described. However, it will be appreciated that the invention is not limited to the embodiments that are described and that some embodiments may not include all the features that are described below. It will be evident, however, that various modifications and changes may be made herein without departing from the broader spirit and scope of the invention as set forth in the appended claims.

Figure 1:
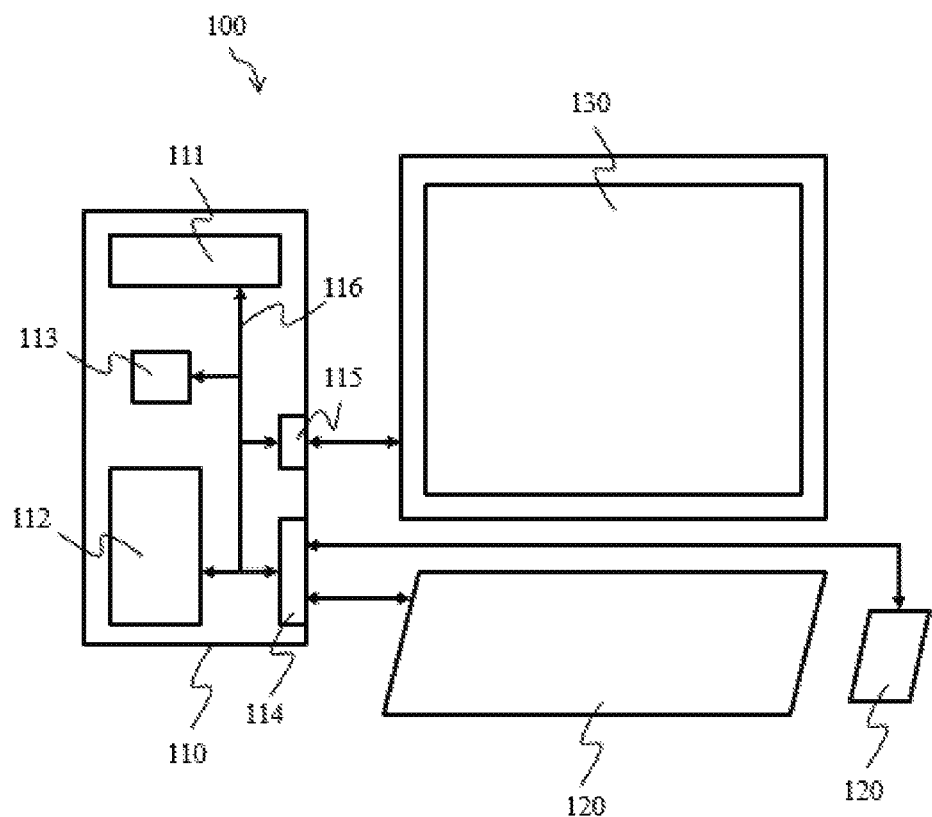
FIG. 1 schematically illustrates an exemplary system 100 according to an embodiment of the present invention.

FIG. 1 of the accompanying drawings schematically illustrates an exemplary system 100 according to an embodiment of the present invention. The exemplary system 100 comprises a computer 110, one or more user input devices 120 and a display 130. The exemplary system 100 may take the form of a conventional computer system, such as, for example, a desktop computer, a personal computer, a laptop, a tablet, a smart phone, a mainframe computer and so on.

The computer 110 comprises a computer-readable storage medium 111, a memory 112, a processor 113, a user input interface 114 and a user output interface 115, which are all linked together over one or more communication buses 116. The computer 110 may also comprise additional interfaces, such as a network interface (not shown), which may also be linked over the one or more communication buses 116.

The computer-readable storage medium 111 and/or the memory 112 may store one or more computer programs (or software or code) and/or data. The computer programs stored in the computer-readable storage medium 111 and/or the memory 112 comprise one or more computer readable program instructions which may be executed by the processor 113. The computer programs stored in the computer-readable storage medium 111 and/or the memory 112 may include an operating system for the processor 113 to execute in order for the computer 110 to function. The computer programs stored in the computer-readable storage medium 111 and/or the memory 112 may include computer programs according to embodiments of the invention or computer programs that, when executed by the processor 113, cause the processor 113 to carry out a method according to an embodiment of the invention and configure the system 100 to be a system according to an embodiment of the invention.

The processor 113 may be any data processing unit suitable for executing one or more computer readable program instructions, such as those belonging to computer programs stored in the computer-readable storage medium 111 and/or the memory 112. As part of the execution of one or more computer-readable program instructions, the processor 113 may store data to and/or read data from the computer-readable storage medium 111 and/or the memory 112. The processor 113 may comprise a single data processing unit or multiple data processing units operating in parallel or in cooperation with each other. The processor 113 may, as part of the execution of one or more computer readable program instructions, store data to and/or read data from the computer-readable storage medium 111 and/or the memory 112.

The user input interface 114 is arranged to receive input from a user, or operator, of the system 100. The user may provide this input via one or more user input devices 120 of the system, such as a mouse (or other pointing device), track-ball or keyboard. Alternatively, the display (or monitor or screen) 130 may be touch-sensitive, so that the user may provide an input by touching or pressing the display 130.

The user output interface 115 is arranged to provide a graphical/visual output to a user, or operator, of the system 100 on the display 130. The processor 113 may instruct the user output interface 115 to form an image/video signal which causes the display 130 to show a desired graphical output.

It will be appreciated that the architecture of the system 100 illustrated in FIG. 1 and described above is merely exemplary and that systems having different architectures using alternative components or using more components (or fewer) may be used instead.

Figure 2:
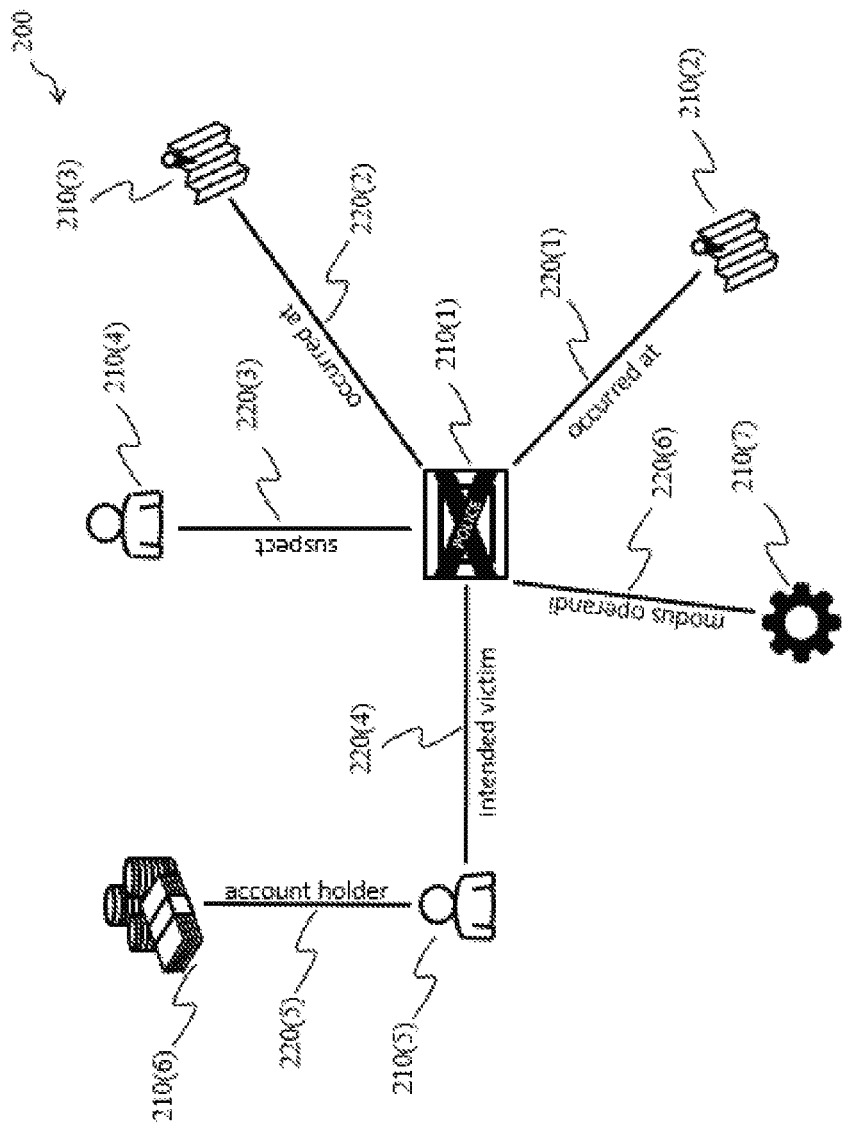
FIG. 2 schematically illustrates an exemplary chart for use with embodiments of the invention.

FIG. 2 schematically illustrates an exemplary chart 200 for use with embodiments of the invention. The chart 200 has one or more schemas associated with it which define (or specify) one or more types of item (or item type) which may form part of the chart 200. The chart 200 may comprise a plurality of items 210, each item 210 being associated with a particular item type defined by the schemas. The schemas further define one or more types of link (or link type) which may be formed between items in the chart. The chart may also comprise a plurality of links 220, each link being associated with a particular link type defined by the schemas and being formed between two or more items 210 in the chart 200.

The chart 200 may be a model to help a user analyze a real-world scenario (or situation). For example, the chart 200 illustrated in FIG. 2 may be used to model and analyze the circumstances surrounding a particular crime. The item types defined by the schemas may therefore represent different kinds of real-world entities which are to be modelled by the chart 200. These may include kinds of entities which are physical or abstract in nature and may include animate as well as inanimate kinds of entities. For example, the schemas associated with the chart 200 illustrated in FIG. 2 may include definitions of "crime event", "location", "person", "account" and "entry point" item types. The items 210 within the chart 200 may represent individual entities of the kinds defined by the schemas.

For example, in the chart illustrated in FIG. 2: item 210(1) is of the "crime event" item type, representing a particular crime event; items 210(2) and 210(3) are of the "location" item type, representing two different locations; items 210(4) and 210(5) are of the "person" item type, representing two different people; item 210(6) is of the "account" type, representing a particular account; and item 210(7) is of the "entry point" type, representing a particular entry point. Similarly, the link types defined by the schemas may represent different kinds of real-world relationships between the entities which are to be modelled by the chart 200. For example, the schemas associated with the chart 200 illustrated in FIG. 2 may include definitions of "occurred at", "suspect", "intended victim", "account holder" and "modus operandi" link types, which can be used with the chart 200 to model the relationships between entities involved in a particular crime. In other words, the links 220 within the chart 200 may represent relationships between entities of the kinds defined by the schemas. For example, the link 220(1) between the crime event item 210(1) and the location item 210(2) is of the "occurred at" link type, indicating a relationship between a crime event and a location at which it occurred (i.e. indicating that the crime event represented by item 210(1) occurred at the location represented by item 210(2)). Similarly, the link 220(2) between the crime event item 210(1) and the location item 210(3) is also of an "occurred at" link type, indicating that the crime event represented by item 210(1) also occurred at the location represented by item 210(3).

As a further example, the link 220(3) between the crime event item 210(1) and the person item 210(4) is the "suspect" link type, indicating a relationship between the crime event represented by item 210(1) and the person, represented by item 210(4), who is suspected of committing it. As yet a further example, the link 220(4) between the crime event item 210(1) and the person item 210(5) is of the "intended victim" link type, indicating a relationship between the crime event represented by item 210(1) and the person, represented by item 210(5), who was the intended victim of that crime. As a yet further example, the link 220(5) between the person item 210(5) and the account item 210(6) is of the "account holder" link type, indicating that the person represented by item 210(5) is the holder of the account represented by item 210(6). As a final example, the link 220(6) between the crime event item 210(1) and the entry point item 210(7) is of the "modus operandi" link type indicating that the entry point represented by item 210(7) was used as part of the way in which the crime represented by item 210(1) was committed.

The schemas define criteria (or rules, conditions or circumstances) specifying whether links of each link type may be validly formed between any two or more items 210 in the chart 200. That is to say, when a link 220 of a particular link type is formed between two or more particular items 210 in the chart 200, the criteria specifying whether a link 210 of that particular link type may be validly formed between those two or more particular items 210 must be met (or satisfied or fulfilled). If the criteria are not met, then a link 220 of that particular link type cannot validly be formed between those two or more particular items 210. The criteria may be based, at least in part, on the respective item types of the two or more items 220 between which the link is to be formed. That is to say, the schemas may define that a particular link type may only be formed between items 210 of a particular type. The criteria may require that all the items 210 involved in the particular link 220 are of the same particular type. Alternatively, the criteria may require that link 220 is between at least one item of a particular type and at least one other item of a particular type. The criteria may allow for alternatives to be specified. In other words, the criteria may specify that one of the items 210 involved in the link 220 must be one of a number of different item types. Alternatively the criteria may specify that if one of the items 210 involved in the link is of a first item type, then the other item(s) 210 involved in the link must be of a second item type, whilst if the item 210 is of a third item type, then the other item(s) 210 involved in the link must be of a fourth item type. The criteria may allow for exclusions to be specified. In other words, the criteria may specify that the items 210 involved in the link cannot be a specified item type (or any of a number of specified item types). It will be appreciated that any combination of the above techniques may be used in specifying the criteria.

Referring back to the exemplary chart 200 of FIG. 2, the schemas associated with the chart 200 may define criteria which specifies that a link of the "occurred at" link type can only be validly formed between an item of the "crime event" item type and an item of the "location" item type. Therefore, the links 220(1) and 220(2) are valid because they are between the crime event item 210(1) and the location items 210(2) and 210(3) respectively. However, a link 220 of the "occurred at" link type could not be formed between the person item 210(5) and the crime event item 210(1) because these criteria would not be fulfilled for such a link. Similarly, the criteria may specify that a link of the "suspect" or "intended victim" types may only be validly formed between a "person" item and a "crime event" item, whilst an "account holder" type of link may only be validly formed between a "person" item and an "account" item, and a "modus operandi" type of link may only be validly formed between a "crime event" item and an "entry point" item.

Although the criteria specifying whether a link of each of the link types involved in the exemplary chart 200 of FIG. 2 are based upon the respective item types of the items involved in the link, it will be understood that the criteria may equally be based, either additionally or alternatively, on other factors which are unrelated to the item types of the items 210 involved in the link 220. As an example, the criteria may be based on properties that are associated with the items 210 involved in the link 220 (these properties may also be defined in the schemas). As a further example, the criteria may be based on the number of links that are already associated with the items involved in the link. The criteria may specify that a link 220 of a particular link type cannot validly be formed between two items when either of those items is already associated with a predetermined maximum number of links. The criteria may be based on the types of link that are already associated with either (or both) of the items 210 involved in the link. For example, the criteria may specify that a link 220 of a particular link type cannot validly be formed between two items 210 if either (or both) of those items already have a link of that particular link type (or, indeed, of a different specified link type). The criteria may be based on the structure of the chart 200 as a whole. For example, the criteria may specify that a link 220 of a particular link type cannot be validly formed if the chart 200 already includes a link 220 (or a maximum number of links 220) of that link type. Alternatively, the criteria may specify that a link 220 of a particular link type cannot be validly formed if the chart 200 already includes a link 220 of a different link type. It will be appreciated, that there are numerous different considerations upon which the criteria specifying whether a link 220 of a particular link type may be formed between two particular items 210 can be based. Furthermore, it will be appreciated that the above-discussed considerations may be combined together in a multitude of ways to specify complex criteria which are based on multiple factors. In summary, the schemas associated with the chart 200 define criteria (or rules, conditions or circumstances) specifying whether links of each link type may be validly formed between any two or more items 210 in the chart 200.

It will be appreciated that the definitions of item types, link types and criteria for specifying whether a link of a particular link type can be formed between two particular items may be encapsulated into the one or more schemas in a variety of ways. A separate schema might be used for each item type, each link type and each criteria. Alternatively, multiple item types, link types and or criteria may be included in the same schema. Indeed, a combination of both approaches may be taken with individual schemas defining some item types, link types and criteria with others being grouped together into a single schema. Any encapsulation (or division) of the definition of item types, link types and criteria into one or more schemas may be used according to embodiments of the present invention.

Figure 3:
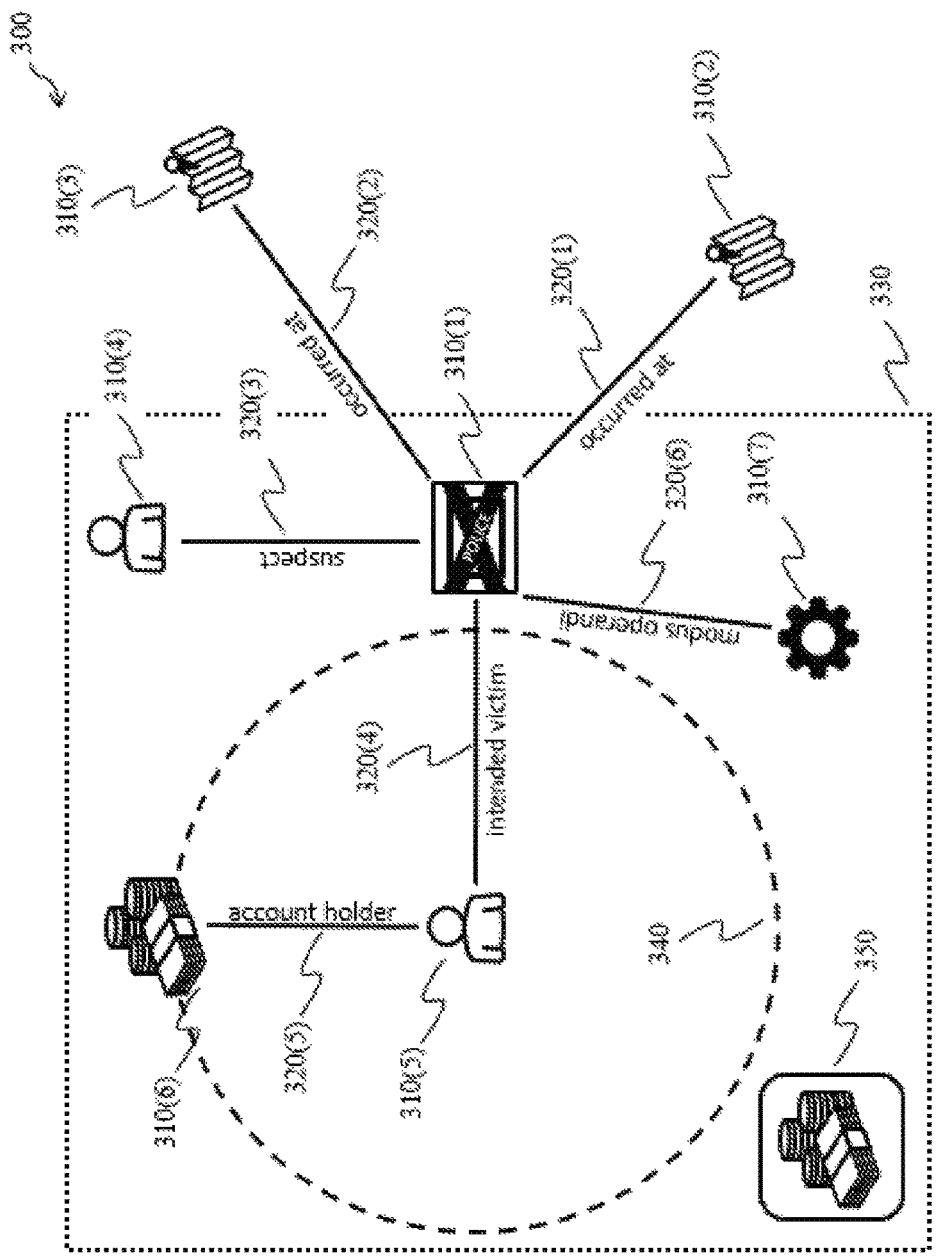
FIG. 3 schematically illustrates a canvas according to embodiments of the invention.

FIG. 3 schematically illustrates a canvas 300 (or digital canvas, view or canvas environment). According to embodiments of the present invention, a graphical representation of the chart 200 is provided on a canvas 300. The canvas 300 allows objects 310 (or graphical elements or shapes) to be arranged spatially thereby enabling the graphical representation of the chart 200 to be generated.

The canvas 300 may comprise a plurality of objects 310, each of which represents a respective item 210 of the chart 200. For example, item 210(1) may be represented by object 310(1), item 210(2) may be represented by object 310(2), item 210(3) may be represented by object 310(3), item 210(4) may be represented by object 310(4), item 210(5) may be represented by object 310(5), item 210(6) may be represented by object 310(6), and item 210(7) may be represented by object 310(7). The objects 320 may take the form of a shape or icon which graphically conveys the item type of the associated item 220 that is represented by the object 320. For example, the object 310(1) illustrated in FIG. 3, has the form of an icon which includes police crime scene tape to graphically convey that the associated (or underlying) item 210(1) that it represents is of the "crime event" type. As a further example, the objects 310(2) and 310(3) have the form of a map to graphically convey that the associated items 210(2) and 210(3) respectively are of a "location" type. As yet a further example, the objects 310(4) and 310(5) have the form of a bust to graphical convey that the items 210(4) and 310(5) that they respectively represent are of a "person" type. As another example, the object 310(6) includes the representation of some money to convent that the item 210(6) that it represents is of an "account" type. As a final example, the object 310(6) depicts a broken window to convey that the object that it represents is of an "entry point" type.

The canvas 300 may also comprise a plurality of lines 320 between the objects 310 which represent the links 220 between the items 210 of the chart 200. For example, link 220(1) may be represented by a line 320(1) between objects 310(1) and 310(2), link 220(2) may be represented by a line 320(2) between objects 310(1) and 310(3), link 220(3) may be represented by a line 320(3) between objects 310(1) and 310(4), link 220(4) may be represented by a line 320(4) between objects 310(1) and 310(5), link 220(5) may be represented by a line 320(5) between objects 310(5) and 310(6), and link 220(6) may be represented by a line 320(6) between objects 310(1) and 310(7). Each line 320 may include text which describes the link type of the link 220 that is associated with that line 320.

Whilst the canvas 300 shown in FIG. 3 uses shapes to graphically convey item types and text to graphically convey link types, it will be appreciated that in general, any means of graphically conveying differences between the types of items 210 and links 220 in the chart 200 may be used. For example, any combination of the use of shape, text, color, style of line, etc. may be used to graphically convey the types of items 210 and links 220 in the chart 200.

A view 330 of the canvas may be provided, to the user as part of a graphical user interface (GUI) to allow the user to visualize all, or part, of the chart 200. For example, the view 330 may be provided to the user on the display 130 of the exemplary system 100 discussed above. As illustrated by the dashed lines in FIG. 3, the view 330 of the representation of the chart 200 on the canvas 300 may only show a portion (or part) of the representation of the chart. In the exemplary view 330 shown in FIG. 3, for example, the objects 310(2) and 310(3) representing "location" items 210(2) and 210(3) may not be visible to the user. Of course, the view 330 may instead encompass the entirety of the representation of the chart 200. The user may be able to adjust which objects 310 are shown in the view 330 by panning (or scrolling) or adjusting the zoom level of the view 330 that is displayed. Conceptually, panning would have the effect of moving the dashed line shown in FIG. 3 about the page, whilst zooming would either enlarge or shrink the area covered by the dashed line.

The graphical user interface (GUI) may allow the user to manipulate (or alter or amend) the layout of the objects 310 on the canvas 300. The user may select an object 310 to be moved using a user input device 120 of the system 100, such as, for example, by using a mouse to align a cursor over the object 310 and then clicking a button. The user may then move the object 310 about on the view of the canvas 300, for example, by moving the mouse whilst the button is depressed (i.e. by dragging the object). The user may then indicate a desired new location for the object 310 on the canvas by, for example, releasing the mouse button which the pointer is at the desired new location. The graphical user interface may also allow the user to add or remove items 210 or links 220 to the chart 200. As an example, icons representing the different types of item 210 or link 220 may be provided in a toolbox, enabling the user to create a new item 210 or link 220 by selecting that icon and dragging it onto the canvas 300. This may result in a new object 350 being shown on the canvas 300 to represent the new item 210. However, it will be appreciated that there are many different ways in which such functionality may be made available to the user.

When a user manipulates the layout of objects on a canvas, either by moving existing objects or by placing new objects onto the canvas, they must make tricky and time-consuming judgements about where the objects are placed in order to preserve the clarity of the representation of the chart. In accordance with embodiments of the invention, an alignment guide 340 is provided to the user to assist the user with the decision about where to place objects 310 on the canvas 300. This alignment guide 340 enables the alignment of objects 310 on the canvas 300 to be driven by the definitions contained in the schemas associated with the underlying chart 200.

Figure 4:
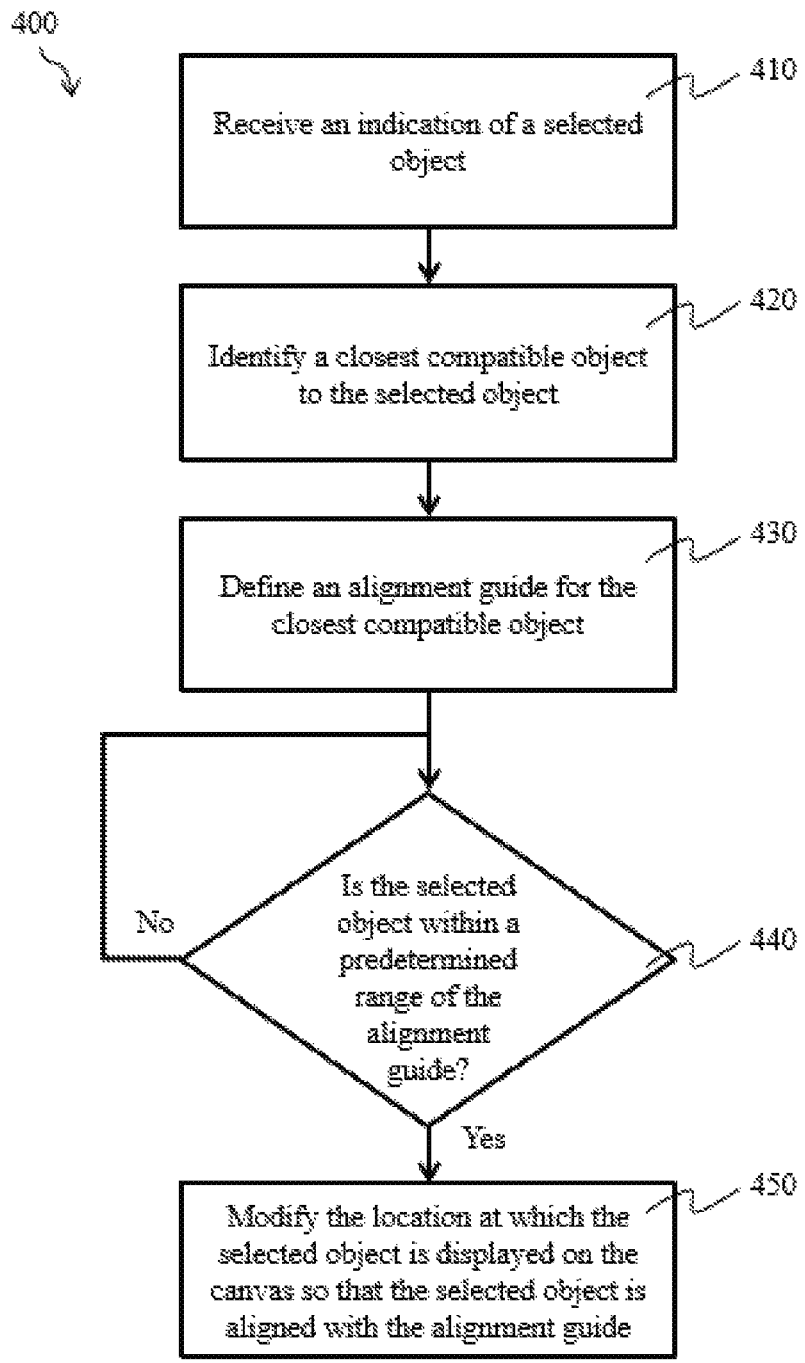
FIG. 4 is a flow diagram that schematically illustrates a computer-implemented method for enabling such schema-driven object alignment on the canvas according to an embodiment of the invention.

FIG. 4 is a flow diagram that schematically illustrates a computer-implemented method 400 for enabling such schema-driven object alignment on the canvas 300 according to an embodiment of the invention.

At a step 410, the method 400 receives an indication, from a user, of a selected object 350 on the canvas. The indication may be provided by the user using a user input device 120 of the system 100. The selected object 350 may be an existing object 310 that is already on the canvas 300, or a newly created object to be placed on the canvas 300. As an example, in FIG. 3, a newly created object for an item of "account" type is being placed on the canvas to serve as the selected object 350. However, the selected item could equally have been one of the other objects 310 already shown on canvas 300. This indication of a selected object 350 (i.e. the selection) is the first step of a move operation in which the user may move the selected object 350 around the canvas 300, for example by "dragging" it with the mouse, and activates the method for schema driven alignment according to an embodiment of the present invention. A graphical indication as to the object 310 that has been selected may be provided. For example, the selected object 350 may be surrounded by a box, as shown on FIG. 3. Other means of graphically indicating which object 310 has been selected may be used instead or in addition.

At a step 420, the method 400 identifies a closest compatible object 310 to the selected object 350. The identification may be performed using the processor 113 of the system 100. The closest compatible object is the object 310 which is displayed closest to the current position of the selected object 350 and for which a link 220 may be formed between the item 210 represented by that object 310 and the item 210 represented by the selected object 350. The determination as to whether a link may be formed between the item 210 represented by an object 310 and the item 210 represented by the selected object 350 may be determined by evaluating, for each type of link specified in the schemas, whether the criteria defined by the schemas for that link type specify that a link of that link type may be validly formed between those two items 210. As an example, referring back to FIG. 3, whilst the closest object to the selected object 350 is the object 310(7) representing the "entry point" item 210(7), the closest compatible object is the object 310(5) representing the "person" item 210(5). This is because, according to the exemplary schemas associated with the exemplary chart 200 which is represented in FIG. 3, there are no link types which may be formed between an "account" type of item, such as that represented by the selected object 350 and an "entry point" type of item, such as that represented by object 310(7). However, the schemas associated with the exemplary chart 200 which is represented in FIG. 3, specify that a link of "account holder" type may be formed between an "account" type of item and a "person" type of item, such as that represented by object 310(5). Therefore, the "person" object 310(5) is the closest compatible object 310, even though the "entry point" object 310(7) is closer to the selected object 350.

The identification of a closest compatible object in step 420 may be performed once for a particular movement of the selected object 350. In other words, the closest compatible object may be identified when the user selects the object 310 that they wish to move on the canvas based on the initial position of the selected object 350 and may not change during the course of the user moving (or dragging) the selected object 350 about the canvas until a final position for the object 310 is reached (i.e. a move operation). The identification of the closest compatible object may alternatively be performed continuously (or frequently) during a movement of the selected object 350. That is to say, in addition to identifying the closest compatible object based on the initial position of the selected object 350, this may be frequently updated to re-identify which object is the closest compatible object based on the current (or new) position of the object as it is moved (or dragged) about the canvas. The frequency with which the closest compatible object is updated could be based on a certain amount of time having elapsed since the closest compatible object was previously updated or it could be based on the selected object 350 having been moved by a certain distance since the closest compatible object was previously identified, or any combination of the two.

The identification of a closest compatible object in step 420 may be restricted so that only objects 310 which are displayed within a predetermined distance of the selected object 350 may be considered. In effect, this means that only objects within an invisible radial boundary of the selected object 350 are considered. The predetermined distance may be based either on a distance as apparent to the user on the screen (that is to say, the distance is not affected by any level of zooming (or scaling) of the view 330 of the canvas 300), or may change based on the current level of zoom (or scaling) applied to the view 330 of the canvas 300. If no closest compatible object is identified within this predetermined distance of the selected object 350, then the method 400 may wait until the selected object 350 has moved to a new position before re-evaluating whether a closest compatible object can be identified for the selected object 350 within a predetermined distance of its new position (it will be appreciated that the new position in this sense may just be a temporary new position at which the object is displayed during the course of a user "dragging" the selected object 350 about the canvas 300). If a closest compatible object is identified within this predetermined distance of the selected object 350 then that object may be used as the closest compatible object throughout the course a of a move operation, as discussed above. Alternatively, if a closest compatible object is identified within this predetermined distance of the selected object 350, then that object may be used as the closest compatible object whilst the selected object 350 remains within predetermined distance of the closest compatible object, but may be re-evaluated if the selected object 350 is moved further away from the closest compatible object than this predetermined distance, at which point a new closest compatible object may be identified based on the new position of the selected object 350 (again, in this sense the new position may just be a temporary new position at which the object is displayed during the course of a user "dragging" the selected object 350 about the canvas 300).

At a step 430, the method 400 defines an alignment guide 340 for the closest compatible object. The alignment guide may be displayed to the user, for example, on screen 130. Equally, however, the alignment guide may not be displayed to the user, but may still remain functional, as described further below. The alignment guide 340 may comprise one or more alignment guide components. The alignment guide components are graphical elements which, when displayed on the canvas 300, serve to identify, to the user, which object is the closest compatible object as well as one or more appropriate positions in which the selected object 350 may be placed near that closest compatible object.

The alignment guide 340 may, for example, include one or more components which are circular in nature (i.e. having the form of a circle with a predetermined radius about the closest compatible object). The user may therefore identify, from the alignment guide, when the alignment guide is displayed, that the closest compatible object is the object at the center of the circle and that an appropriate position for placing the selected object 350 near that closest compatible object may be any point on the circle.

The alignment guide 340 may, additionally or alternatively, include one or more components which are radial in nature (i.e. lines diverging radially from the closest compatible object). These radial components may follow a direction from the closest compatible object towards the selected object 350. Similarly, the length of such radial components may be predetermined, or may be based on the distance between the closest compatible object and the selected object 350. As an example, a radial alignment component could take the form of a line between the closest compatible object and the selected object 350.

The step 430 may further comprise a step of identifying whether there any links 220 in the chart 200 between the item 210 which is represented by the closest compatible object and any items 210 having the same item type as the item 210 that is represented by the selected object 350. The method 400 may define an alignment guide component for one, or some, or all, of the links 220 that are identified as being between the item 220 represented by the closest compatible object and any items 210 of the same item type as the item represented by the selected object 350. These alignment guide components may have a dimension which is defined by the length of that link. It will be appreciated, that the length of the link 220 may be considered to be the distance on the canvas 300 between objects 310 representing items 210 involved in the link 220. The alignment guide components that are defined for one, or some, or all, of the identified links may be circular, in which case the radius of the circle may be the same as the length of the associated link for which the alignment guide component is being displayed. In this case, the object 310 representing the item 210 that is connected to the item 210 represented by the closest compatible object 310 by the identified link will lie on the path of the circle that forms the alignment guide component on the canvas 300. All, or some, or one of the alignment guide components may be displayed, for example, on screen 130 of system 100. This means that the user can readily identify the link (and the linked item) that is associated with that alignment guide component. It is envisaged that other forms (or shapes) may be used for one, or some, or all of the alignment guide components, such as the use of a square alignment guide component. In this case, the dimension of the alignment guide component may be the length of a side of the square and may be dependent on the length of the such that the object 310 representing the item 210 that is linked to the item 210 represented by the closest compatible object lies on the alignment guide component. The alignment guide components that are displayed may be a mixture of different forms (such as some being circular whilst others are square or radial).

As discussed above, the view 330 of the canvas 300 that is displayed to the user may not display all the objects 310 on the canvas 300 at the same time. The step of displaying the alignment guide 340 may therefore further comprise determining whether the entirety of the alignment guide 340 can be displayed within a current view 330 of the canvas 300. If the alignment guide 340 cannot be displayed in its entirety within the current view 330, the method 400 may suppress the display of (or hide) the alignment guide 340 so that it is not visible to the user. Where the alignment guide 340 comprises multiple alignment guide components, the step 430 may determine separately for each of the alignment guide components whether the entirety of that alignment guide component can be displayed within the current view 330 of the canvas 300. The method 400 may then suppress the display of (or hide) any alignment guide components that cannot be entirely displayed within the current view 330, whilst allowing any alignment guide components that can be entirely displayed within the current view 330 to be displayed. By hiding (or suppressing the display of) the alignment guide, or its components, when it cannot be entirely displayed within the current view 330, the cognitive burden on the user may be lowered.

Returning to the example illustrated in FIG. 3, a circular alignment guide 340 is defined and displayed around the closest compatible object 310(5) to the selected object 350. This circular alignment guide 340 could be set to have a predetermined radius. Alternatively, the circular alignment guide 340 may have a radius which is dependent on the length of link 220(5). In particular, the method 400 may, at step 430, identify that object 310(6) represents an item which is also of an "account" type (i.e. it is the same type of item 210 as the item 210 represented by the selected object 350) and which is linked to the item 210(5) represented by the closest compatible object 310(5). The method 400 may then display the circular alignment guide component for the nearest compatible object 210(5) and specify that the radius is equal to the length the link 220(5) between the item 210(6) represented by object 310(6) and the item 210(5) represented by the closest compatible object 310(5). If there were any other links 220 that were identified to any other "account" items from the item 210(5) represented by the closest compatible object 310(5), then additional alignment guide components could have been displayed for those links.

At a step 440, the method 400 calculates whether the selected object 350 has been moved within a predetermined range of the alignment guide 340. In other words, as the selected object 350 is moved (or dragged) by the user during a move operation, the method calculates whether the current position of the selected object 350 during that move operation is within a certain distance of the alignment guide. If it is calculated that the current position of the selected object is within a predetermined range 340 then the method proceeds to a step 450, discussed below. Otherwise, the method 400 continues to calculate whether the selected object 350 is moved within a predetermined range of the alignment guide 340 during the remainder of the move operation. This calculation may be performed using processor 113 of system 100.

As a further example, based on the exemplary representation of the chart 200 illustrated in FIG. 3, it can be seen that if the user were to select one of the objects 310(2) or 310(3) which represent the "location" items 210(2) and 210(3) respectively, the method 400, having received the indication of the object representing a "location" item at step 410, may identify that the closest compatible object is the object 310(1) which represents the crime event item 210(1), as described above in relation to step 420. Then, at step 430, the method may identify the object representing the other "location" item as being of the same item type represented by the selected item and linked to the item 210(1) that is represented by the closest compatible object 310(1). The method may therefore display an alignment guide having an alignment guide component which is circular in nature and has a radius which is the same as the length between the object representing the other "location" item and the closest compatible object 310(1). This would allow the user to very easily reposition one of the objects 310(2) and 310(3) which represent the "location" items 210(2) and 210(3) so that they are both displayed at the same radius from the object 310(1) which represents the "crime event" item 210(1) to which they are both linked. This helps to maintain the clarity of the representation of the chart 200.

At the step 450, the method 400 modifies the location at which the selected object is displayed on the canvas 300 so that the selected object 350 is aligned with the alignment guide (if the selected object has been moved within a predetermined range of the alignment guide. This has the visual effect of causing the selected object 350 to jump or snap to the alignment guide thereby aligning the display of the selected object 350 with the alignment guide. As an example, the position of the selected object 350 may be modified such that the center of the selected object 350 coincides with a line of the alignment guide. The user may then end the movement operation (or dragging) of the selected object 350, committing the placement of the selected object 350 in an appropriate position with respect to the closest compatible object (as indicated by the alignment guide). In doing so, the schema driven alignment mode may be deactivated so that the alignment guide will no longer be displayed (at least until the next move operation conducted by the user). The alignment of the selected object 350 with the alignment guide may comprise the selected object 350 being aligned with a point on the alignment guide which is closest to the current position of the selected object 350, or, where the alignment guide 340 comprises multiple alignment guide component, to the closest point on the closest alignment guide component. Whilst it will be appreciated that whilst displaying the alignment guide 340 to the user provides the user with a visual cue as to where the item may be best placed, the snapping behavior of step 450 can be achieved based on an alignment guide 340 which has been defined but not displayed (i.e. a hidden alignment guide), thereby aiding the user in positioning the object.

Where the alignment guide 340 comprises alignment guide components which are associated with links between the closest compatible object and other objects which represent items 210 of the same type as the item 210 represented by the selected object 350, the user may indicate a selected alignment guide component which is associated with a type of link that the user wishes to create between the item 210 represented by the selected object 350 and the item 210 represented by the closest compatible object 310. The indication that is received from the user of the selected alignment guide component could, for example, be the indication of the end of the movement operation while the selected object 350 is aligned with the selected alignment guide component. This could be provided, for example, by the user performing an action on a user input device 120, such as releasing a button on a mouse, to release the selected object 350. The method 400 may then further comprise creating a link 220 of the same link type as the type of link associated with the selected alignment guide component between the item 210 represented by the selected object 350 and the item 210 represented by the closest compatible object 310. Prior to creating the link 220, the method 400 may request confirmation from the user that they wish to create the link 220.

Returning to the exemplary chart 200 represented on canvas 300 of FIG. 3, when the user releases the selected "account" item over the displayed alignment guide, the user may be presented with a dialog box may asking "Do you wish to create an 'account holder' link to the 'person' item 'Melanie SHARP'?" to which the user may respond with either "Yes" or "No". If the user selects the "Yes" option, a link 220 may be created between the newly placed "account" item 210 and the "person" item 210(5). Alternatively, the link 220 could be created automatically upon release of the "account" item over the displayed alignment guide without requesting confirmation from the user.

Whilst embodiments of the invention have been described in relation to a number of specific item and link types with reference to the chart 200 that is illustrated in FIG. 2, it will be appreciated that this is merely exemplary and that any kind of item or link types may be defined by one or more schemas which may be used with the chart 200. Furthermore, it will be appreciated that the numbers of items and links included in the chart 200 may vary greatly. For example, some charts 200 for use with the present invention may consist of a single item, with no links. Other charts 200 may comprise only two items 210 with one or no links 220 between them. Other charts 200 may include large numbers of items 210 and links 220. The chart 200 may be formed by adding objects 310 to the canvas 300. In this case, the chart may not comprise any items 210 or links 220 to begin with, the items 210 and links 220 being subsequently added by the user.

The present invention enables the alignment of objects 310 on a canvas 300 based on the nature of the items 210 and available link types 220 that are defined in one or more schemas that are associated with the underlying chart 200. The presentation of objects 310 on the canvas 300 may most clearly convey the nature of the underlying chart 200 when the alignment of objects is based on radial (or polar) considerations rather than grid-based (or Cartesian coordinate) type considerations. This is because the positions of the objects 310 on the canvas 300 are symbolic of the underlying chart 200, with relative positioning between objects 310 being more important for clearly conveying the relationships in the underlying chart 200 than absolute positioning on the canvas (which may be somewhat arbitrary). Therefore, the alignment guide of the present invention helps reduce the effort required by a user when adjusting the layout of a representation of the chart whilst helping ensure that the representation remains clear.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for enabling a schema-driven object alignment on a canvas, wherein the canvas displays a chart comprising a plurality of items, wherein the chart comprises a model analyzing a real-world scenario and the plurality of items comprise real-world entities associated with the model, wherein the canvas comprises a plurality of objects, and the plurality of objects represent the plurality of items on the chart, the method comprising:
   defining, by one or more schemas, an associated item type for each item associated with the plurality of items, wherein the one or more schemas further comprise definitions that define at least one type of link formed between the plurality of items in the chart based on the defined associated type of item for each item, wherein the definitions comprise text that is displayed on the canvas and that describes the at least one type of link formed;
   based on the definitions and a compatibility between each item defined by the associated item type, specifying whether the at least one type of link is capable of being validly formed between at least two items associated with the plurality of items;
   receiving an indication of a selected object on the canvas, wherein the selected object represents a first item associated with the plurality of items on the chart;
   based on the definitions and the defined associated item type for the selected object, identifying, from amongst the plurality of objects, a closest compatible object which is displayed closest to a position of the selected object on the canvas and for which at least one link associated with the at least one type of link is capable of being formed between a second item represented by the closest compatible object and the first item represented by the selected object;
   based on a predetermined distance, maintaining the second item as the closest compatible object to the selected object as the selected object is dragged across the plurality of objects on the canvas;
   in response to the selected object being dragged out of the predetermined distance from the second item, and based on an elapsed time that the selected object is dragged out of the predetermined distance from the second item, identifying a third item as the closest compatible object;
   defining an alignment guide for the closest compatible object; and
   in response to a movement of the selected object:
   determining whether the selected object has been moved within a determined range of the alignment guide;
   in response to the determination that the selected object has been moved within the determined range of the alignment guide, modifying a location at which the selected object is displayed on the canvas so that the selected object is aligned with the alignment guide; and
   based on the associated item type and the definitions, forming the at least one type of link between the selected object and the closest compatible link, wherein forming the at least one type of link further comprises displaying, on the canvas, text between the selected object and the closest compatible link to describe the at least one type of link formed based on the real-world scenario.

2. The computer-implemented method of claim 1, further comprising displaying the alignment guide.

3. The computer-implemented method of claim 2, wherein displaying the alignment guide further comprises:
   determining whether the alignment guide can be displayed within a view of the canvas environment; and
   in response to the determination that the alignment guide cannot be displayed within a view of the canvas environment, suppressing the display of the alignment guide.

4. The computer-implemented method of claim 2, wherein displaying the alignment guide for the closest compatible object further comprises:
   identifying, within the chart, the at least one link between the second item represented by the closest compatible object and at least one item with the same associated item type as the first item represented by the selected object; and
   displaying, for the at least one link, at least one alignment guide component having a dimension which is defined by the length of the at least one link.

5. The computer-implemented method of claim 4, wherein the at least one alignment guide component is displayed, circular, and has a dimension that is a radius of a circle.

6. The computer-implemented method of claim 4, further comprising:
   displaying, for the at least one alignment guide component, an indication of the at least one type of link associated with the at least one link of the at least one alignment guide component.

7. The computer-implemented method of claim 4, further comprising:
   receiving an indication of a selected alignment guide component; and
   creating, in the chart, at least one link of the same at least one type of link as the at least one link associated with the selected alignment guide component between the first item represented by the selected object and the second item represented by the closest compatible object.

8. The computer-implemented method of claim 7, wherein the indication of the selected alignment guide component comprises a release of the selected object while the selected object is aligned with the selected alignment guide component.

9. The computer-implemented method of claim 4, wherein displaying the alignment guide further comprises:
determining, for the at least one alignment guide component, whether the at least one alignment guide component can be displayed within a view of the canvas; and
in response to the determination that the at least one alignment guide component cannot be displayed within a view of the canvas, suppressing the display of the at least one alignment guide component.

10. The computer-implemented method of claim 1, wherein identifying the closest compatible object comprises identifying the plurality of objects that are displayed within a determined distance of the selected object and identifying the closest compatible object from amongst the identified plurality of objects.

11. The computer-implemented method of claim 1, wherein the alignment guide comprises an alignment guide component which is circular with a determined radius.

12. A system for enabling a schema-driven object alignment on a canvas, wherein the canvas displays a chart comprising a plurality of items, wherein the canvas comprises a plurality of objects, and the plurality of objects represent the plurality of items on the chart, the system comprising:
a display for displaying a view of the canvas;
a user input device for receiving an indication, from a user, of a selected object on the canvas; and
a processor capable of performing a method comprising:
defining, by one or more schemas, an associated item type for each item associated with the plurality of items, wherein the one or more schemas further comprise definitions that define at least one type of link formed between the plurality of items in the chart based on the defined associated type of item for each item, wherein the definitions comprise text that is displayed on the canvas and that describes the at least one type of link formed;
based on the definitions and a compatibility between each item defined by the associated item type, specifying whether the at least one type of link is capable of being validly formed between at least two items associated with the plurality of items;
receiving an indication of a selected object on the canvas, wherein the selected object represents a first item associated with the plurality of items on the chart;
based on the definitions and the defined associated item type for the selected object, identifying, from amongst the plurality of objects, a closest compatible object which is displayed closest to a position of the selected object on the canvas and for which at least one link associated with the at least one type of link is capable of being formed between a second item represented by the closest compatible object and the first item represented by the selected object;
based on a predetermined distance, maintaining the second item as the closest compatible object to the selected object as the selected object is dragged across the plurality of objects on the canvas;
in response to the selected object being dragged out of the predetermined distance from the second item, and based on an elapsed time that the selected object is dragged out of the predetermined distance from the second item, identifying a third item as the closest compatible object;
defining an alignment guide for the closest compatible object; and
in response to a movement of the selected object:
determining whether the selected object has been moved within a determined range of the alignment guide;
in response to the determination that the selected object has been moved within the determined range of the alignment guide, modifying a location at which the selected object is displayed on the canvas so that the selected object is aligned with the alignment guide; and
based on the associated item type and the definitions, forming the at least one type link between the selected object and the closest compatible, wherein forming the at least one type of link further comprises displaying, on the canvas, text between the selected object and the closest compatible link to describe the at least one type of link formed based on the real-world scenario.

13. The system of claim 12, further comprising displaying the alignment guide.

14. The system of claim 13, wherein displaying the alignment guide further comprises:
determining, for at least one alignment guide component, whether the at least one alignment guide component can be displayed within a view of the canvas; and
in response to the determination that the at least one alignment guide component cannot be displayed within a view of the canvas, suppressing the display of the at least one alignment guide component.

15. The system of claim 14, wherein the at least one alignment guide component is circular and has a dimension that is a radius of a circle.

16. The system of claim 13, wherein displaying the alignment guide for the closest compatible object further comprises:
identifying, within the chart, the at least one link between the second item represented by the closest compatible object and at least one item with the same associated item type as the first item represented by the selected object; and
displaying, for the at least one link, at least one alignment guide component having a dimension which is defined by the length of the at least one link.

17. The system of claim 16, further comprising:
receiving an indication of a selected alignment guide component; and
creating, in the chart, at least one link of the same at least one type of link as the at least one link associated with the selected alignment guide component between the first item represented by the selected object and the second item represented by the closest compatible object.

18. A computer program product for enabling a schema-driven object alignment on a canvas, wherein the canvas displays a chart comprising a plurality of items, wherein the chart comprises a model analyzing a real-world scenario and the plurality of items comprise real-world entities associated with the model, wherein the canvas comprises a plurality of objects, and the plurality of objects represent the plurality of items on the chart, the computer program product comprising a computer readable storage medium having stored thereon:
program instructions to define, by one or more schemas, an associated item type for each item associated with the plurality of items, wherein the one or more schemas further comprise definitions that define at least one type of link formed between the plurality of items in the chart based on the defined associated type of item for each item, wherein the definitions comprise text that is displayed on the canvas and that describes the at least one type of link formed;
based on the definitions and a compatibility between each item defined by the associated item type, program instructions to specify whether the at least one type of link is capable of being validly formed between at least two items associated with the plurality of items;

program instructions to receive an indication of a selected object on the canvas wherein the selected object represents a first item associated with the plurality of items on the chart;

based on the definitions and the defined associated item type for the selected object, program instructions to identify, from amongst the plurality of objects, a closest compatible object which is displayed closest to a position of the selected object on the canvas and for which at least one link associated with the at least one type of link is capable of being formed between a second item represented by the closest compatible object and the first item represented by the selected object;

program instructions to, based on a predetermined distance, maintain the second item as the closest compatible object to the selected object as the selected object is dragged across the plurality of objects on the canvas;

in response to the selected object being dragged out of the predetermined distance from the second item, and based on an elapsed time that the selected object is dragged out of the predetermined distance from the second item, program instructions to identify a third item as the closest compatible object;

program instructions to define an alignment guide for the closest compatible object;

in response to a movement of the selected object, program instructions to determine whether the selected object has been moved within a determined range of the alignment guide, and in response to the determination that the selected object has been moved within the determined range of the alignment guide, program instructions to modify a location at which the selected object is displayed on the canvas so that the selected object is aligned with the alignment guide; and based on the associated item type and the definitions, program instructions to form the at least one type link between the selected object and the closest compatible, wherein the program instructions to form the at least one type of link further comprises program instructions to display, on the canvas, text between the selected object and the closest compatible link to describe the at least one type of link formed based on the real-world scenario.

* * * * *